United States Patent [19]
Jannborg

[11] Patent Number: 4,830,569
[45] Date of Patent: May 16, 1989

[54] INDUSTRIAL ROBOT HAVING A DETACHABLE ELECTRICAL CONNECTION BETWEEN HOUSING ON ROBOT ARM AND TOOL HOLDER

[75] Inventor: Björn Jannborg, Västerås, Sweden

[73] Assignee: Asea Brown Boveri AB, Västerås, Sweden

[21] Appl. No.: 174,190

[22] Filed: Mar. 28, 1988

[30] Foreign Application Priority Data

Mar. 31, 1987 [SE] Sweden ................................. 8701333

[51] Int. Cl.$^4$ ............................................. B25J 17/02
[52] U.S. Cl. ..................................... 414/729; 173/117; 279/1 ME; 901/29; 901/38; 901/41
[58] Field of Search ........................ 414/729, 918, 735; 901/37, 38, 50, 28, 29, 41; 280/420, 421, 422; 279/1 R, 1 ME; 173/117; 29/40

[56] References Cited

U.S. PATENT DOCUMENTS

| | | | |
|---|---|---|---|
| 3,247,978 | 4/1966 | Neumeier | 901/29 X |
| 3,272,347 | 9/1966 | Lemelson | 901/29 X |
| 4,378,959 | 4/1983 | Susnjara | 414/735 X |

Primary Examiner—Robert J. Spar
Assistant Examiner—Donald W. Underwood
Attorney, Agent, or Firm—Watson, Cole, Grindle & Watson

[57] ABSTRACT

A device in an industrial robot permitting rapid exchange of tools in spite of the fact that the tools require both electric and pneumatic operating pulses. The robot hand supports a housing and a tool holder attachment rotatably journalled in the housing, a tool holder being detachably arranged in the tool holder attachment. An automatically breakable electrical connection is provided between the housing and the tool holder by means of slip rings, arranged either on the housing or on the tool holder, and collector shoes, making contact with the slip rings, on the corresponding tool holder or housing.

8 Claims, 6 Drawing Sheets

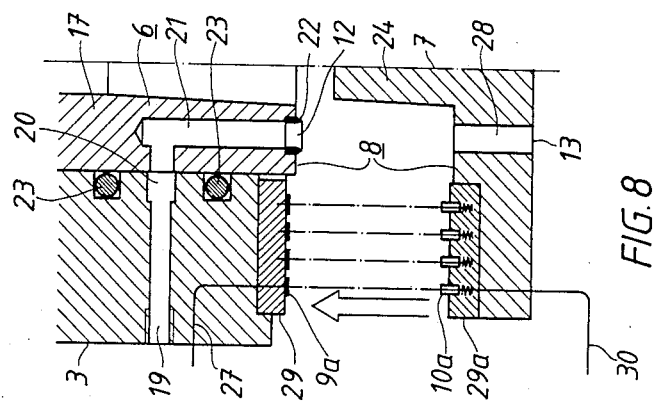

INDUSTRIAL ROBOT HAVING A DETACHABLE ELECTRICAL CONNECTION BETWEEN HOUSING ON ROBOT ARM AND TOOL HOLDER

TECHNICAL FIELD

This invention relates to the field of robotics, and in particular to the mounting of tools on the arm of an industrial robot.

DISCUSSION OF PRIOR ART

As the fields of applications of industrial robots are successively increasing, increasingly greater demands are also being placed on the movability of the wrist relative to the arm of a robot and hence on the tool carried by the hand forming an extension of the robot wrist.

In the past it was sufficient for the tool mounted on a robot arm to be rotatable up to one complete turn around its own axis. Nowadays, the demands have increased, and it can be assumed that eventually the demand will be for multi-turn rotation. Since, in addition, the tool carried by the robot arm must be capable of being supplied with both electrical operating current and hydraulic and pneumatic impulses, problems may arise since this supply has up to now taken place by means of loose wires and hoses (e.g., as shown in FIG. 1 of the accompanying drawings).

Further, one tool should be capable of being rapidly exchanged for another or different tool, which in prior art devices has been accomplished by a quick coupling arrangement provided between a tool holder attachment, often called a swivel axis, carried by the robot hand, and a detachable tool holder. In those cases where electrical operating current has been supplied to the tool, however, electric wires have still been provided all the way up to the tool, which has made the exchange of tools extremely difficult since these wires must first be disconnected and then again connected to the new tool. Also, hoses for hydraulics and pneumatics have been provided in the same way as and when they have been needed.

OBJECTS OF THE INVENTION

One object of the invention is to provide an improved form of device in an industrial robot which permits an electrically-powered tool to be mounted on an arm of the robot and rotated in either direction about an axis of the wrist without regard to the number of turns completed in either direction.

Another object is to provide a coupling for a tool in an industrial robot which permits pressurized fluid to be supplied to a tool that is capable of unlimited rotation in either direction about an axis of the wrist of the robot arm.

A further object is to avoid the use of loose wires for feeding electrical power to an electrically-operated tool mounted on the end of the arm of an industrial robot and/or the use of hoses for feeding air or hydraulic liquid to a fluid-pressure operated tool.

A still further object is to facilitate the replacement of one electrically-powered tool on the arm of a robot by another tool.

The present invention relates to a device by means of which the above-mentioned drawbacks can be eliminated and the aforesaid objects achieved.

SUMMARY OF THE INVENTION

The invention relates to a device in an industrial robot, the hand of which supports a housing and a tool holder attachment rotatably journalled in the housing, in which tool holder attachment a tool holder is detachably mounted. The invention is characterized in that a demountable connection is provided between the housing and the tool holder by means of electrically-conducting slip rings arranged on either the housing or the tool holder and by means of collector shoes, making electrical contact with the slip rings, on the corresponding tool holder or housing.

The invention thus eliminates the drawback of loose electric wires running from the robot and the non-rotatable housing over to the rotatable tool and the problems caused by these wires getting twisted around the robot arm concurrently with the tool rotating two or more turns. Also, and perhaps even more important, a very quick coupling and decoupling is possible which also controls the transmission of electrical power between the tool holder attachment and the tool holder, since the slip ring device also serves as a contact-breaking member.

In those cases where it is also necessary to supply pneumatic or hydraulic operating power, a hoseless quick coupling can be provided for this purpose according to a further feature of this invention. Channels can be formed in the above-mentioned housing, which channels emerge at the boundary between the housing and the shaft for the tool holder attachment rotatably journalled in the housing. The channels communicate with annular slots arranged around the mentioned shaft and are provided either in the shaft or in the housing. Channels are provided in the tool holder attachment, one end of these channels communicating with the mentioned annular slots and the other end of the channels emerging at the boundary between the tool holder attachment and the detachable tool holder. In the tool holder corresponding channels have been arranged to be connected, when the tool holder is inserted into the tool holder attachment, into sealing connection with the channels of the tool holder attachment. This results in an electrical and pneumatic (or hydraulic) connection between the robot arm and the tool completely without wires and hoses which means that:

a rapid exchange of tools is possible in spite of the fact that both electric current and compressed air (or hydraulics) are required to operate the tool, there are no loose cables or hoses which may wear out or be torn off, the tool can be rotated an unlimited number of turns, and finally a more compact and reliable robot is obtained.

BRIEF DESCRIPTION OF THE DRAWINGS

The invention will now be further described, by way of example, with reference to the accompanying drawings, wherein:

FIG. 8 is a sketch schematically illustrating the attachment device of the invention.

DESCRIPTION OF THE PREFERRED EMBODIMENT

Figures 1, 2:
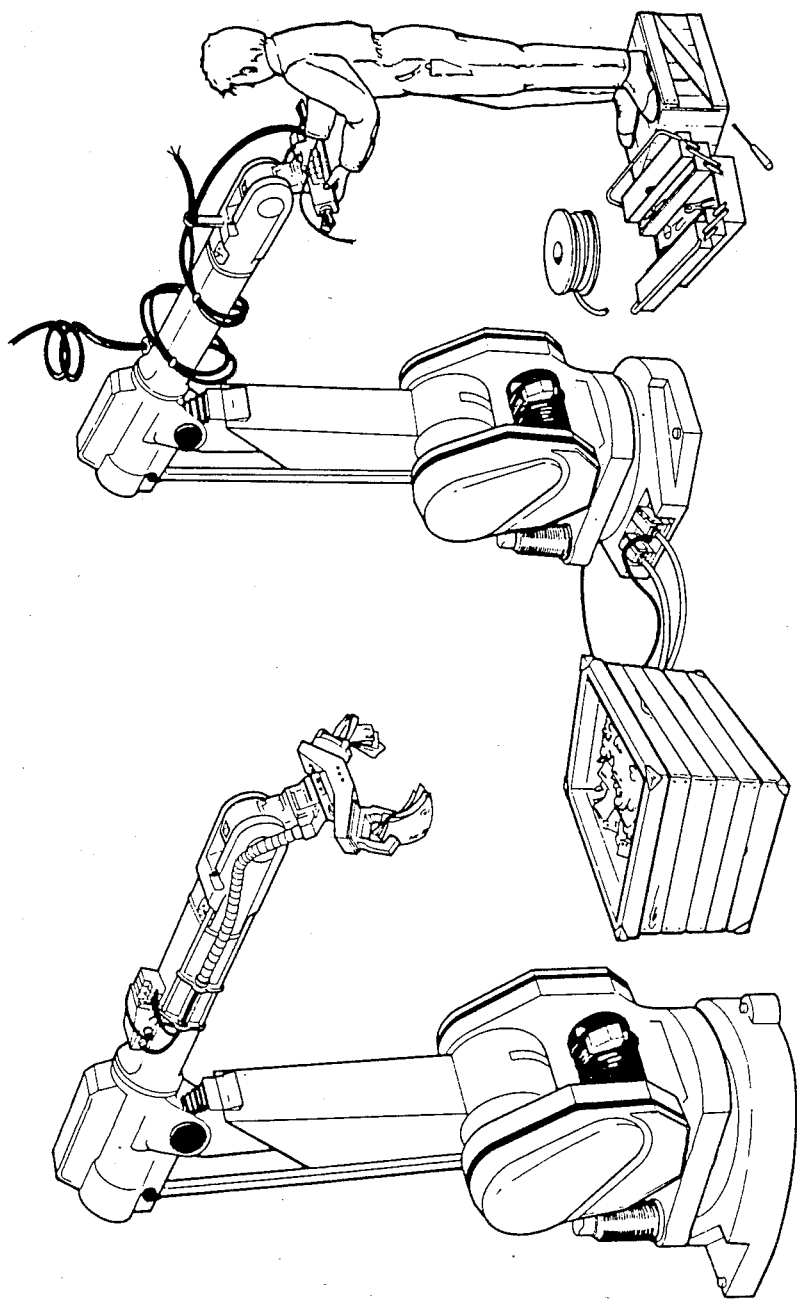
FIG. 1 shows a prior art robot with loose cables and hoses required for powering a tool on the robot's arm.
FIG. 2 is a view corresponding to FIG. 1 showing an embodiment of robot according to the invention.
Figure 3:
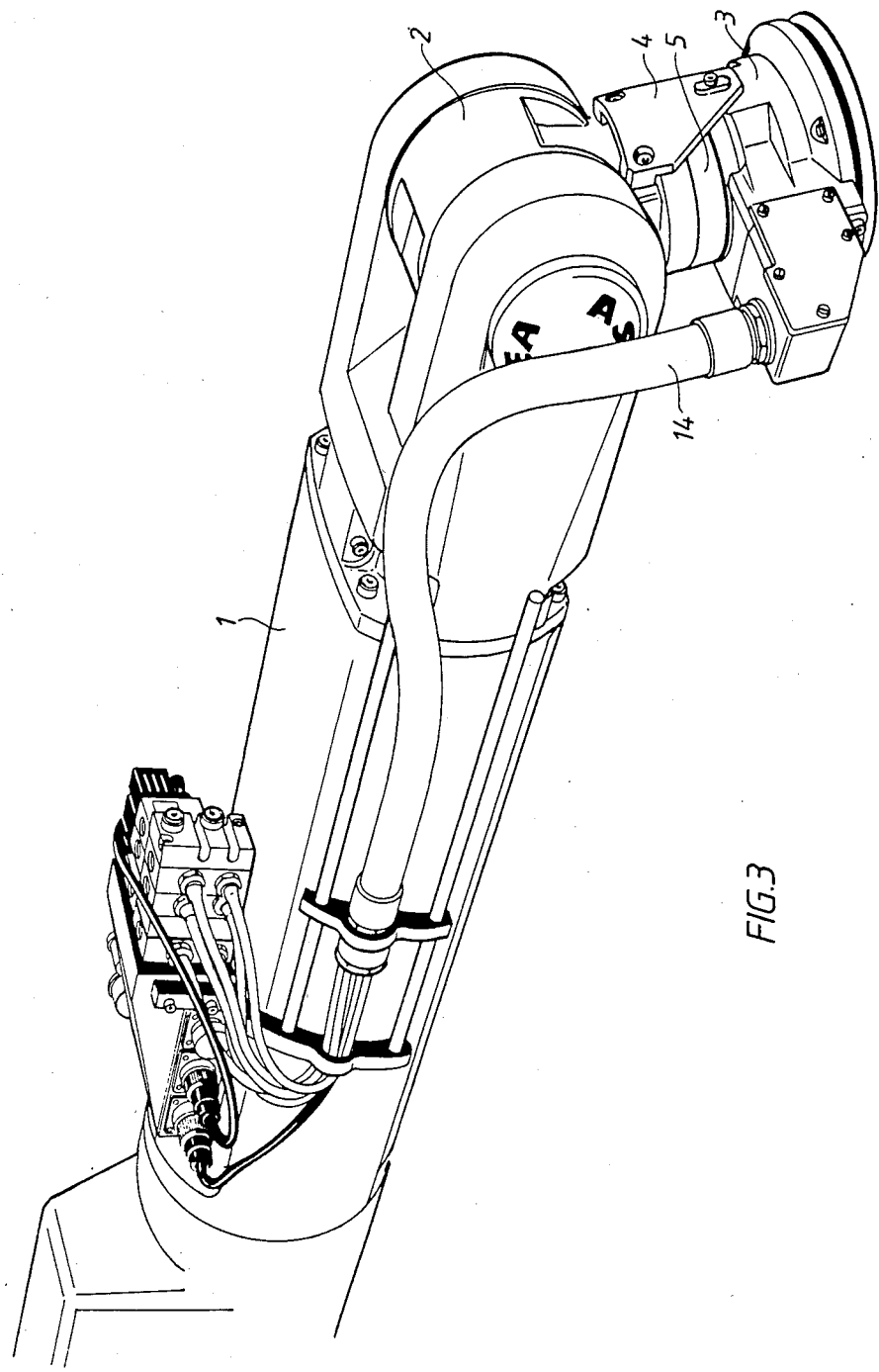
FIG. 3 shows, on an enlarged scale, the outer part of the robot arm of the embodiment of FIG. 2, with the pivotable hand or tilt housing thereof devoid of a tool.

FIG. 3 shows a robot arm 1 having a pivotable outer joint (the tilt housing) or robot hand 2. The hand 2 supports a housing 3 by means of a holder 4. In the housing 3, a tool holder attachment (not shown in FIG. 3) is rotatably mounted and connected together with a rotating disc 5, which drives the tool holder attachment around. The housing 3 with the enclosed rotatable tool holder attachment is often referred to as the swivel.

Figure 4:
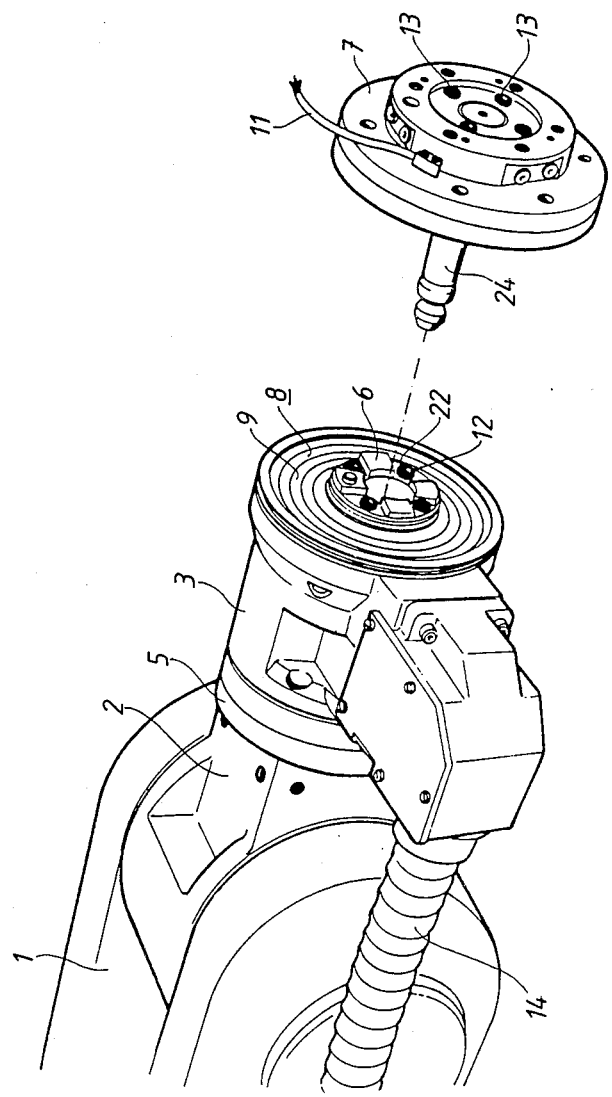
FIG. 4 shows the outer part of the arm of FIG. 3 in a somewhat different position and also shows a detachable tool holder.

FIG. 4 shows the outer end of the housing 3 and the tool holder attachment 6 rotatably journalled in the housing 3, the shaft of the attachment extending through the housing 3 to the rotating disc 5. Detached from the tool holder attachment 6, the actual tool holder 7 is shown to the right in FIG. 4. At the boundary 8 between the housing and the tool holder 7 the housing 3 is provided with a plurality of electrically-conducting concentric slip rings 9. As will be clear from FIG. 4, the slip rings 9 have different radii, the axis of rotation of the tool holder attachment 6 constituting the center. Further, the slip rings 9 are flat and washer-shaped. In the connected position of the tool holder 7, collector shoes 10 (see FIG. 7) make contact with the slip rings 9, the collector shoes 10 being arranged on the tool holder 7 in a position which is concealed in FIG. 4. The electrical connection from the collector shoes 10 is extended through the holder 7 and is completed by means of a short cable 11 to a tool fixedly arranged on the holder 7 (not shown). Openings 12 on the attachment 6 define channels for a pneumatic (or hydraulic) system. A rubber-elastic packing 22 is arranged around each opening 12 whereby when the tool holder 7 is inserted into the attachment 6, the openings 12 are brought into respective sealing connection with channels in the tool holder 7, which channels run through the holder 7 and open out into the openings 13, from where the compressed air is forwarded to channels in the tool itself. A reinforced casing 14 is avilable to contact electric wires and hoses for a pneumatic or hydraulic system.

Figure 5:
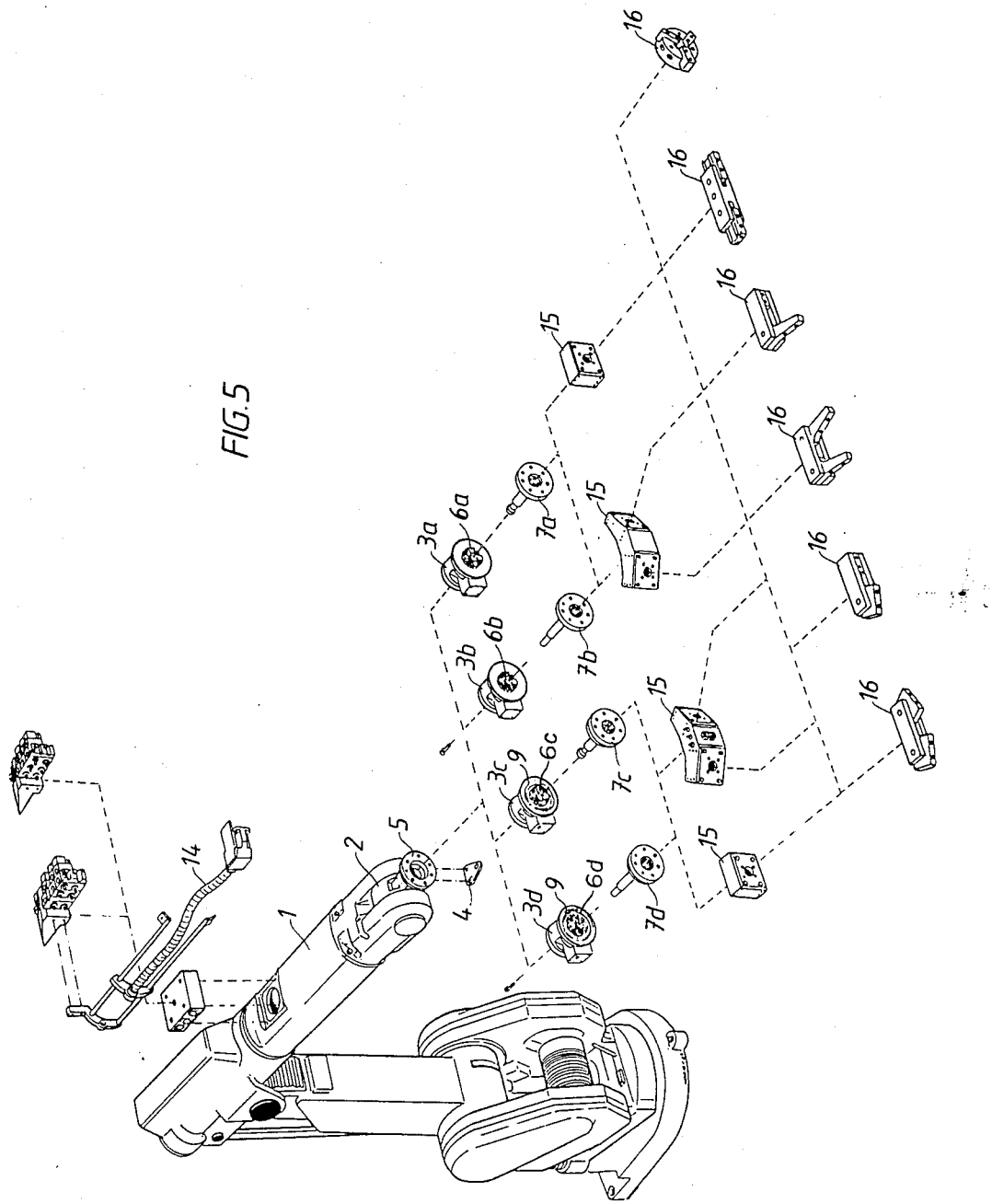
FIG. 5 is an exploded view of certain parts of the robot as well as a range of different housings, tool holder attachments, tool holders and tools that may be used therewith.

FIG. 5 shows the flexibility of the mounting arrangement which is the core of this invention. As in FIGS. 3 and 4, 5 designates the rotating disc of the robot hand 2 mounted on the arm 1 of an industrial robot. On the rotating disc 5 is mounted the swivel, whereby a selected housing 3 is fixed to the robot hand 2 by means of the holder 4. Inside each housing 3 is arranged a rotatable tool holder attachment 6 which is connected to the rotating disc 5. Four different housings 3a–3d are shown in FIG. 5 and four different tool holders 7a–7d are available for connection thereto. The connection 6a, 7a represents a pneumatically-operated locking device for fixing the holder 7a to the attachment 6a. The connection 6b, 7b designates a manual solution. Neither 6a, 7a nor 6b, 7b provides any electrical connection between the housing 3 and the holder 7. Connections 6c, 7c and 6d, 7d designate the corresponding automatic and manual operation of the locking between the holder 7c, 7d and the respective attachment 6c, 6d. In addition, these last two connections provide an electrical connection via the slip rings 9 between the housing 3c, 3d and the holder 7c, 7d. All the tool holders 7a–7d are fed with compressed air via channels in the housing 3 and the attachment 6.

Numerals 15 in FIG. 5 designate different kinds of tools which in turn are provided with different grippers 16. Clearly wide interchangeability between tools and grippers is possible.

Figure 7:
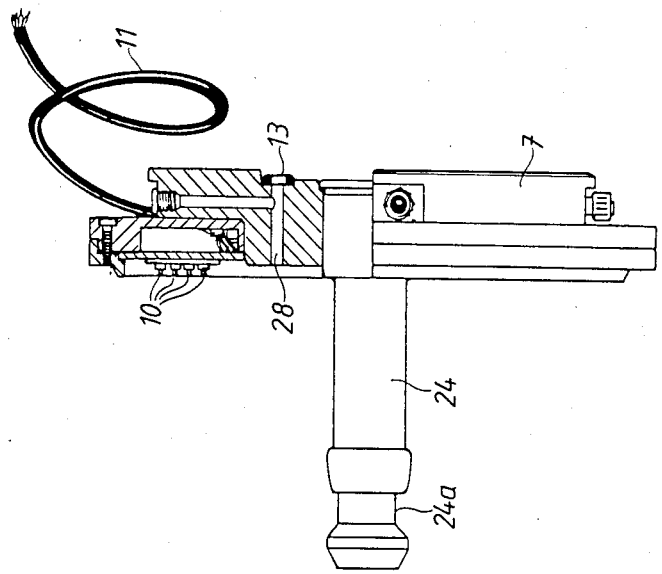
FIG. 7 is a side view of a tool holder ready for fitting into the housing.
Figure 6:
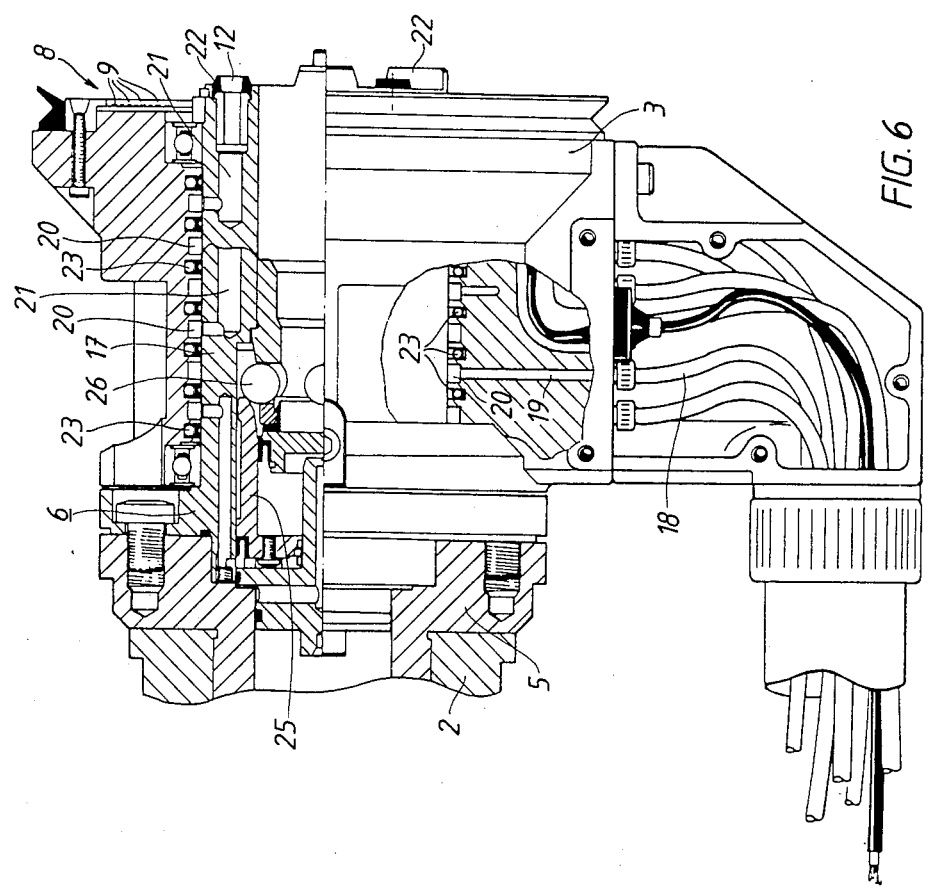
FIG. 6 is a partially broken-away view of a housing with a tool holder attachment (also called swivel)

FIGS. 6 and 7 represent a partially broken-away sketch of the housing 3 and the tool holder 7. A hollow shaft 17 of the tool holder attachment 6 is rotatably journalled in the housing 3, which in turn is fixed to the robot hand 2.

FIG. 6 shows how hoses 18 are connected to channels 19 in the housing 3. These channels 19 open out into annular slots 20 arranged at the boundary between the shaft 17 and the housing 3. The slots 20 extend completely around the shaft 17 and are provided in the housing 3 and/or in the shaft 17. From each slot 20 a respective channel 21 extends axially in the shaft 17 to terminate at an opening 12, around which is arranged a rubber packing 22. On both sides of each slot 20 there are arranged annular O-ring seals 23 to prevent leakage of compressed air or oil between slots 20 along the shaft 17. The electrically-conducting slip rings 9 are concentrically arranged around the axis of rotation of the swivel, and 10 designates the corresponding collector shoes on the tool holder 7. The tool holder 7 is provided with a central rod 24 which can be locked to the tool holder attachment 6 by means of a ball-type lock, the balls 26 of which are urged into a groove 24a on the rod 24 by a compressed-air operated sleeve 25.

FIG. 8 shows a schematic sketch of the housing 3 with the tool attachment 6 and the associated tool holder 7. Only the half of each on one side of the axis of rotation is shown in FIG. 8. FIG. 8 shows how electric current is conducted via a conductor 27 to a slip ring 9a, which may be fixed on an insulating plate 29. From the slip ring 9a the current is forwarded to a tool (not shown) via a collector shoe 10a when the tool holder 7 is inserted into the attachment 6 and the collector shoe 10a thus makes contact with the slip ring 9a. The shoe 10a (and as shown three other similar shoes) is supported in spring-urged manner on an insulating plate 29a and is connected to an electrical lead 30 which passes to a motive means (not shown) on a robot tool.

FIG. 8 also shows how a pressurized fluid (e.g. pneumatic) connection between the housing 3 and the tool holder 7 is established and broken via the channel 19, the slots 20, the channel 21, the opening 12, a channel 28 and the opening 13. The rubber packing 22 ensures that the channels 21 and 28 are sealingly connected to each other. The annular seals 23 on both sides of the slot 20 prevent leakage along the shaft 17.

Various modifications can clearly be made to the embodiment illustrated and all such modifications falling within the spirit and scope of the following claims fall within the ambit of this invention.

What is claimed is:

1. An industrial robot having a hand which carries a housing, a tool holder attachment rotatably journalled in said housing, and a tool holder detachably arranged in said attachment
characterized in that
a demountable electrical connection is provided between said housing and said tool holder by means of slip rings arranged on one of said housing and said tool holder and by means of collector shoes, making electrical contact with said slip rings, on the respective other one of said tool holder and housing.

2. A robot according to claim 1, wherein a demountable connection for pressurized medium is provided at a boundary between said housing and said tool holder by means of channels provided in said housing, said channels opening out to the said boundary between said housing and a shaft for the tool holder attachment, rotatably journalled in said housing, and communicating with annular slots arranged around said shaft, channels arranged in said tool holder attachment communicating with said annular slots and opening out at the said boundary between said housing and said detachable tool holder, corresponding channels being arranged to be connected, upon the insertion of said tool holder into said tool holder attachment, in a sealing connection with the channels of said tool holder attachment.

3. A robot as claimed in claim 2, in which said annular slots are formed in the housing.

4. A robot as claimed in claim 1, in which the slip rings are applied in a part of the said boundary between said housing and said tool holder which extends at right angles to the axis of rotation of said tool holder attachment and consists of concentric flat, washer-shaped rings having different radii and having said axis of rotation as their center.

5. A robot as claimed in claim 2, in which the slip rings are applied in a part of the said boundary between said housing and said tool holder which extends at right angles to the axis of rotation of said tool holder attachment and consists of concentric, flat, washer-shaped rings having different radii and having said axis of rotation as their center.

6. A robot according to claim 5, in which the axially extending channels for pressurized medium are located closer to the axis of rotation than the innermost of said slip rings.

7. A robot according to claim 1, in which each collector shoe consists of a spring-urged member.

8. In an industrial robot having a robot arm, supporting a hand which carries a housing in which a tool holder attachment is journalled to rotate about a rotational axis, the tool holder attachment being designed to receive a tool holder which turns with said tool holder attachment about said axis relative to the housing;
the improvement which includes
at least two separated rings of electrically conducting material mounted on the housing concentric with the rotational axis and, mounted on the tool holder, a respective contact shoe for each ring,
means being provided for feeding electrical power from said contact shoe to an electrical motive means of a robot tool carried by said tool holder.

* * * * *